US012700279B2

(12) United States Patent　　　　　　(10) Patent No.: US 12,700,279 B2
David et al.　　　　　　　　　　　　　　(45) Date of Patent: Aug. 4, 2026

(54) SERVER CONNECTIVITY FOR A DISPENSING MACHINE AND RELATED PROCESSES

(71) Applicant: Trinity Axis Inc., Harleysville, PA (US)

(72) Inventors: Jeremiah Divyan David, Tamil Nadu (IN); David D. Davidar, Schwenksville, PA (US)

(73) Assignee: Trinity Axis Inc., Harleysville, PA (US)

( * ) Notice: Subject to any disclaimer, the term of this patent is extended or adjusted under 35 U.S.C. 154(b) by 833 days.

(21) Appl. No.: 18/092,085

(22) Filed: Dec. 30, 2022

(65) Prior Publication Data

US 2024/0221451 A1　　Jul. 4, 2024

(51) Int. Cl.
　　*G07F 9/00*　　　　(2006.01)
　　*G06Q 10/087*　　　(2023.01)
　　*G06Q 20/18*　　　(2012.01)
　　*G06Q 30/0241*　　(2023.01)
　　*G07F 11/00*　　　(2006.01)

(52) U.S. Cl.
　　CPC ........... *G07F 9/002* (2020.05); *G06Q 10/087* (2013.01); *G06Q 20/18* (2013.01); *G06Q 30/0241* (2013.01); *G07F 9/006* (2013.01); *G07F 11/004* (2020.05)

(58) Field of Classification Search
　　CPC ........ G07F 9/002; G07F 9/006; G07F 11/004; G07F 9/001; G07F 9/023; G07F 9/026; G06Q 10/087; G06Q 30/0241; G06Q 20/18; G06Q 20/3276
　　See application file for complete search history.

(56) References Cited

U.S. PATENT DOCUMENTS

| | | | |
|---|---|---|---|
| 7,072,855 B1 | 7/2006 | Godlewski et al. | |
| 8,138,930 B1 * | 3/2012 | Heath ..................... | G01W 1/00 |
| | | | 455/456.3 |
| 8,812,558 B1 | 8/2014 | Qian | |
| 8,990,868 B2 | 3/2015 | Lee et al. | |
| 9,268,472 B1 | 2/2016 | Daboub et al. | |
| 9,311,071 B2 | 4/2016 | Tan et al. | |
| 9,898,884 B1 * | 2/2018 | Arora ................. | G06Q 30/0226 |
| 10,200,487 B2 | 2/2019 | Arabo et al. | |
| 10,200,850 B2 | 2/2019 | Chao | |
| 10,666,751 B1 | 5/2020 | Price et al. | |
| 10,884,729 B2 | 1/2021 | Naibero et al. | |
| 11,044,188 B2 | 6/2021 | Martin et al. | |
| 11,124,405 B2 | 9/2021 | Kline et al. | |
| 11,232,188 B2 | 1/2022 | Mummadl et al. | |

(Continued)

*Primary Examiner* — Timothy R Waggoner

(74) *Attorney, Agent, or Firm* — C. Tumey Law Group PLLC

(57)　　　　　ABSTRACT

Systems and methods of the present disclosure relate to server connectivity for a dispensing machine and related processes such as mapping of a vending machine to a location via a network server and software application using an optical code; updating a planogram for a vending machine via a network server; updating inventory/pricing for items in a vending machine via a server using a second application; updating authorized personnel access data on a vending machine via a server; and managing advertisements/campaigns in a vending network system.

7 Claims, 7 Drawing Sheets

TO FIG. 1B

(56)               References Cited

U.S. PATENT DOCUMENTS

| | | | |
|---|---|---|---|
| 2004/0068346 A1* | 4/2004 | Boucher | G07F 9/002 |
| | | | 700/241 |
| 2010/0029691 A1* | 2/2010 | Dong | A61K 31/519 |
| | | | 514/259.41 |
| 2013/0035787 A1* | 2/2013 | Canter | G06Q 30/0226 |
| | | | 700/232 |
| 2014/0179231 A1* | 6/2014 | Charania | G07F 9/001 |
| | | | 455/517 |
| 2015/0296373 A1 | 10/2015 | Morejon et al. | |
| 2016/0092581 A1 | 3/2016 | Joshi et al. | |
| 2022/0058906 A1 | 2/2022 | Dundigalla et al. | |
| 2022/0164828 A1 | 5/2022 | Hicken et al. | |
| 2022/0398557 A1* | 12/2022 | Richards | G06Q 20/208 |

\* cited by examiner

SERVER CONNECTIVITY FOR A DISPENSING MACHINE AND RELATED PROCESSES

BACKGROUND

Dispensing systems may include machines to dispense a variety of items, including beverages, food, and other consumer products. However, to update the inventory using these systems involves a technician to use buttons on the machine to make adjustments for inventory count, visual graphics on the machine, and prices of products. This may be inconvenient and time consuming.

SUMMARY

Disclosed herein are exemplary systems and methods for server connectivity and related processes for a dispensing machine such as a vending machine. A method for mapping of a dispensing machine to a location via a network server and software application using an optical code, the method includes displaying an optical code on a first application associated with a dispensing machine; pre-allocating the dispensing machine to a location via a cloud application server; receiving with the cloud application server, a request for a menu badge notification, wherein the request is received from a second application; transmitting from the cloud application server, a list of active locations that are ready for allocation; receiving with the cloud application server, a selection for the location from the list of active locations; requesting an API call with push device token and update type for allocating the location; transmitting a push notification message for performing an update action, to the first application; receiving with the cloud application server, a response for storing a message ID, a notification type, a dispensing machine ID, success and/or failure state/status in a notification table, wherein the response is transmitted from a cloud messaging server; transmitting a request for updating a read status for the message ID that is mapped with the dispensing machine ID, the notification ID and type in the notification table, wherein the request is transmitted from the first application to the cloud application server; sending a request for changing a screen layout upon allocation of the dispensing machine, and a request for updating an advertisement, dispensing machine access data, and the location, wherein the request is sent from the first application to the cloud application server; receiving with the first application, updates for changing the screen layout upon allocation, the advertisement, the dispensing machine access data, and the location; and allocating the dispensing machine to the location.

A method for updating a planogram for the dispensing machine via the network server, the method includes transmitting a request for creating a planogram, wherein the request is transmitted to a cloud application server from a web application; creating the planogram for the location; transmitting a request from the web application to the cloud application server, the request including a request to assign the planogram to the location; assigning the planogram to the location; requesting an API call with push device token and update type for updating the planogram; transmitting a push notification message for performing an update action, to a first application associated with a dispensing machine at the location; receiving with the cloud application server, a response for storing a message ID, notification type, dispensing machine ID, success and/or failure state/status in a notification table, wherein the response is sent from the cloud messaging server to the cloud application server; transmitting a request for updating a read status for the message ID that is mapped with the dispensing machine ID, the notification ID and type in the notification table, wherein the request is transmitted from the first application to the cloud application server; transmitting a request for updating the planogram with product details for dispensing machines at the location, wherein the request is transmitted from the first application to the cloud application server, wherein the products details include details of products that are available in the dispensing machine; receiving with the application, data for downloading product images and storing product information; and updating the planogram.

A method for updating inventory for a dispensing machine via a server using a second application, the method includes receiving with a cloud application server, an update on a restocking process for products in a dispensing machine, wherein the update request is sent from a second application to a cloud application server; sending a message indicating the update request of restocking process is successful, wherein the message is sent from the cloud application server to the second application; requesting an API call with push device token and update type for updating inventory, wherein the request is transmitted from the cloud application server to a cloud messaging server; transmitting a push notification message for performing an update action, to a first application associated with a dispensing machine; receiving with the cloud application server, a response for storing a message ID, notification type, dispensing machine ID, success and/or failure state/status in a notification table, wherein the response is sent from the cloud messaging server to the cloud application server; transmitting a request for updating a read status for the message ID that is mapped with the dispensing machine ID, the notification ID and type in the notification table, wherein the request is transmitted from the first application to the cloud application server; transmitting a request for updating the inventory, wherein the request is transmitted from the first application associated with the dispensing machine, to the cloud application server; and receiving with the first application associated with the dispensing machine, update for inventory data related to product information including manufacturing date, packaging ID, batch numbers, brand name, product name, product description details, product ID, product type, product image ID, product images, product dimensions, product weight, product shape, product expiry date, product contents, product ingredients, nutritional facts, allergen details, product quantity, price update and internal structure info including internal structure ID, name and image, product structure allocation ID, dimensions and product coordinates ID with position values in the dispensing machine.

A method for updating a product price via a server, the method includes receiving with a cloud application server, an update on product price for products in a dispensing machine, wherein the update request is sent from a second application to a cloud application server; sending a message indicating the product price update request is successful, wherein the message is sent from the cloud application server to the second application; requesting an API call with push device token and update type for updating the product price, wherein the request is transmitted from the cloud application server to a cloud messaging server; transmitting a push notification message for performing an update action, to a first application associated with a dispensing machine; receiving with the cloud application server, a response for storing a message ID, notification type, dispensing machine ID, success and/or failure state/status in a notification table, wherein the response is sent from the cloud messaging server to the cloud application server; transmitting a request for updating a read status for the message ID that is mapped with the dispensing machine ID, the notification ID and type in the notification table, wherein the request is transmitted from the first application to the cloud application server; transmitting a request for updating the product price, wherein the request is transmitted from the first application associated with the dispensing machine, to the cloud application server; and receiving with the first application associated with the dispensing machine, update for the product price, data related to product information including manufacturing date, packaging ID, batch numbers, brand name, product name, product description details, product ID, product type, product image ID, product images, product dimensions, product weight, product shape, product expiry date, product contents, product ingredients, nutritional facts, allergen details, product quantity, and internal structure info including internal structure ID, name and image, product structure allocation ID, dimensions and product coordinates ID with position values in the dispensing machine.

A method for updating access data of authorized personnel for a dispensing machine via a server, the method includes receiving with a cloud application server, a request for adding access data for a dispensing machine, wherein the update request is sent from a web application to a cloud application server; sending a message indicating the access data update request is successful, wherein the message is sent from the cloud application server to the web application; requesting an API call with push device token and update type for updating the access data, wherein the request is transmitted from the cloud application server to a cloud messaging server; transmitting a push notification message for performing an update action, to a first application associated with a dispensing machine; receiving with the cloud application server, a response for storing a message ID, notification type, dispensing machine ID, success and/or failure state/status in a notification table, wherein the response is sent from the cloud messaging server to the cloud application server; transmitting a request for updating a read status for the message ID that is mapped with the dispensing machine ID, the notification ID and type in the notification table, wherein the request is transmitted from the first application to the cloud application server; transmitting a request for updating the access data, wherein the request is transmitted from the first application associated with the dispensing machine, to the cloud application server; and receiving with the first application associated with the dispensing machine, access data including access type, access card holder name, card number, unique key ID, access level; and storing the received access data in a local database associated with the first application.

A method for managing advertisements/campaigns in a vending/dispensing network system, the method includes receiving with a cloud application server, a request for scheduling advertisements for display on a dispensing machine, wherein the update request is sent from a web application to a cloud application server; sending a message indicating the update request for scheduling is successful, wherein the message is sent from the cloud application server to the web application; requesting an API call with push device token and update type for updating the advertisement, wherein the request is transmitted from the cloud application server to a cloud messaging server; transmitting a push notification message for performing an update action, to a first application associated with a dispensing machine; receiving with the cloud application server, a response for storing a message ID, notification type, dispensing machine ID, success and/or failure state/status in a notification table, wherein the response is sent from the cloud messaging server to the cloud application server; transmitting a request for updating a read status for the message ID that is mapped with the dispensing machine ID, the notification ID and type in the notification table, wherein the request is transmitted from the first application to the cloud application server; transmitting a request for updating advertisement information and fetching at least one media file, wherein the request is transmitted from the first application associated with the dispensing machine, to the cloud application server; and receiving with the first application associated with the dispensing machine, data for downloading media and storing advertisement information including advertisement ID, start date and time of advertisement, end date and time of advertisement, no of looping, advertisement timeline ID with media details including media ID, media type, images, videos, optical code with downloadable features, optical code with URL links, optical code with coupons, optical code with promotion codes and media URLs. The advertisement information is stored in the local database associated with the first application.

BRIEF DESCRIPTION OF THE DRAWINGS

These drawings illustrate certain aspects of some examples of the present disclosure and should not be used to limit or define the disclosure.

DETAILED DESCRIPTION

It is to be understood that the present disclosure is not limited to particular devices or methods, which may, of course, vary. It is also to be understood that the terminology used herein is for the purpose of describing particular embodiments only and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

The present disclosure relates to server connectivity and related processes for dispensing of items from a dispensing system such as a vending machine or dispensing machine. The dispensing system may include a system for dispensing items upon purchase via a network of computers and peripherals that are able to communicate with each other. The dispensing system may include a device with at least one application running on it. The techniques as described herein allow for: (1) mapping of a vending machine to a location via a network server and software applications using an optical code; (2) updating a planogram for a vending machine via a network server; (3) updating inventory/ inventory pricing for a vending machine via a server using a second application (e.g., a web or mobile application); (4) updating access data of authorized personnel on a vending machine via a server; and (5) managing advertisements/ campaigns in a vending network system.

Figure 1A:
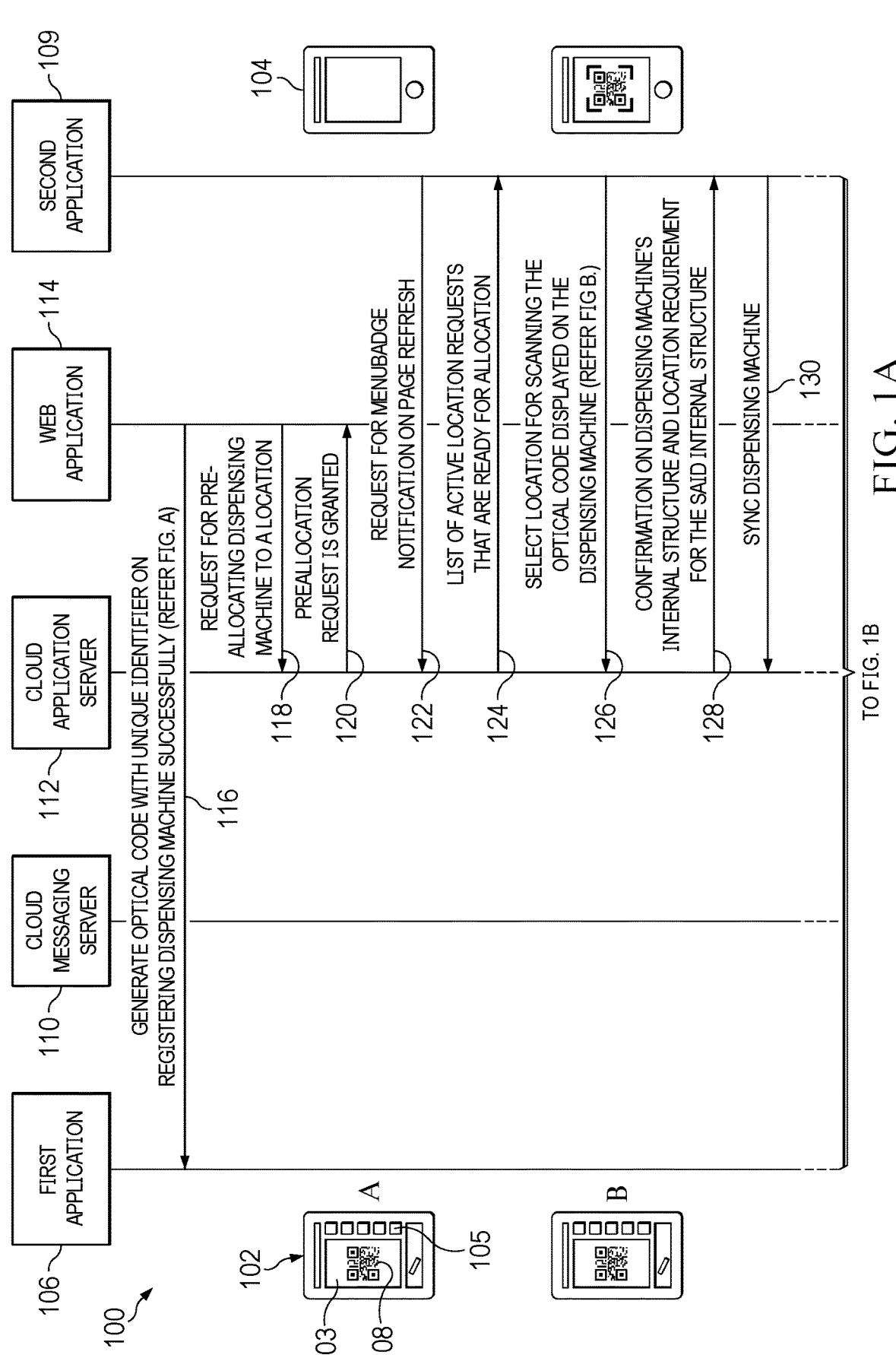
FIGS. 1A and 1B illustrate a method for mapping of a dispensing machine to a location via a network server and software applications using an optical code, in accordance with examples of the present disclosure.
Figure 1B:
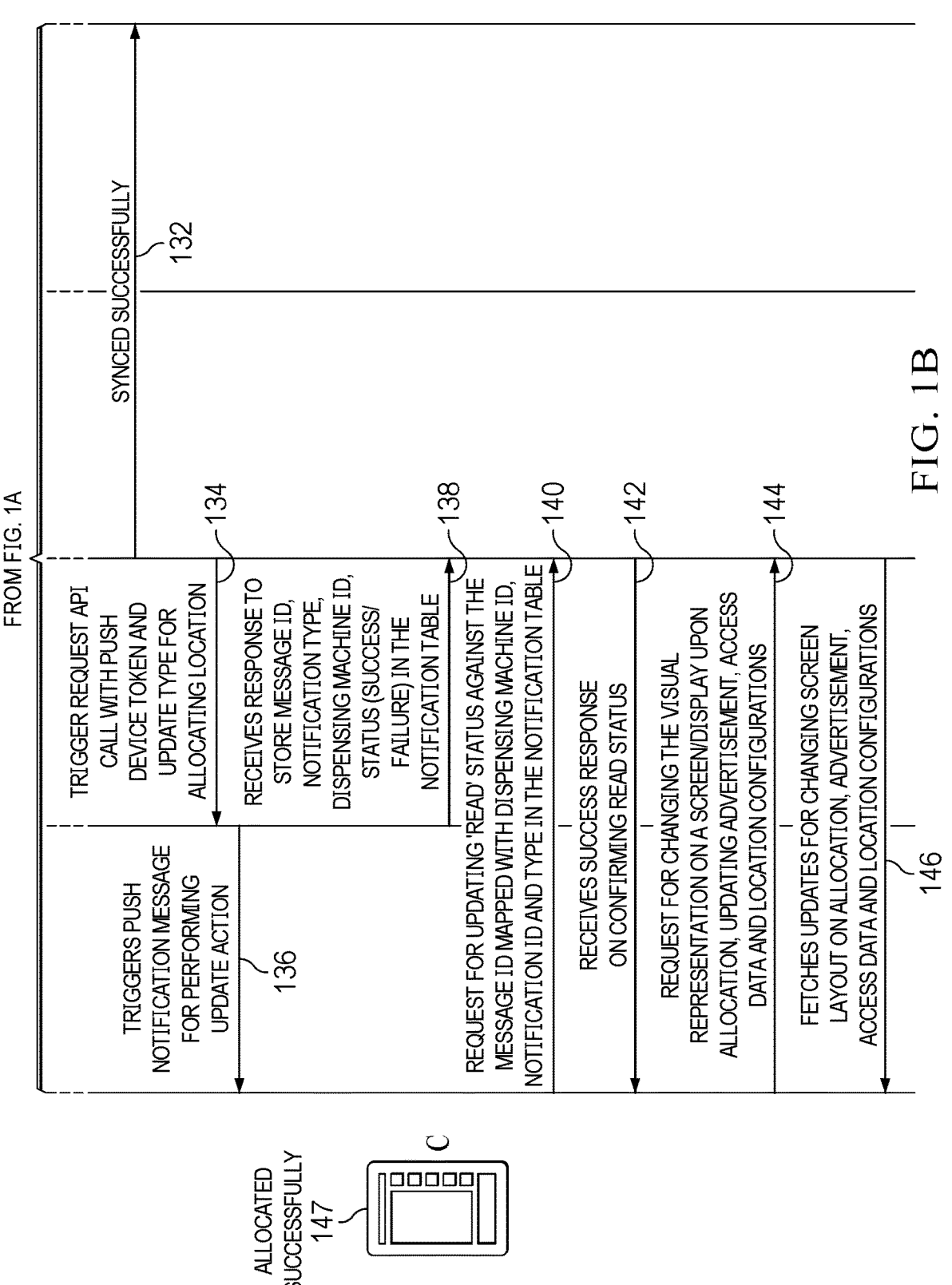

FIGS. 1A and 1B illustrate a method for mapping of a dispensing machine to a location via a network server and software applications using an optical code, in accordance with examples of the present disclosure. As shown on FIG. 1A, a network 100 includes a dispensing machine 102 (e.g., a vending machine) and a device 104 (e.g., an electronic user device such as a smartphone, tablet, laptop). The dispensing machine 102 includes (or is associated with) a first application 106 for operating the dispensing machine 102 within the network 100. An optical code 108 is displayed by the dispensing machine 102 on a display 103. The device 104 includes a second application 109 (software) for operating the device 104 within the network 100. The network 100 also includes a first application 106, a cloud messaging server 110, a cloud application server 112, a web application 114 and a second application 109.

The dispensing machine 102 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EE-PROM), and/or flash memory; as well as communications media such wires, optical fibers, microwaves, radio waves, and other electromagnetic and/or optical carriers; and/or any combination of the foregoing. The processing unit may be coupled with a communication interface such as wifi module, sim card module, ethernet module. The communication interface may allow the dispensing machine to be connected to local area network (LAN), wireless area network (WAN) and/or the internet through one or more modules.

The dispensing machine 102 may also include internal compartment/product layout structure, input device(s) (e.g., sensor(s), keyboard, mouse, touchpad, scanners, RFID readers, card readers, NFC readers, data reader devices, touch screen, buttons, switches) and output device(s) (e.g., display, monitor, printer, secondary display unit). The display 103 is also an example of an output device. The sensors may include a motion sensor (e.g., PIR), a heat sensor, an IR sensor, a light sensor, and/or an input sensor. The input device(s) and output device(s) provide a user interface.

After installation of a dispensing machine at a location or after setup of software on a dispensing machine, at step 116, the optical code 108 is generated with a unique device identifier (e.g., a code) upon registering the dispensing machine 102 with the web application 114. At step 118, the web application 114 requests the cloud application server 112 for pre-allocating a device (e.g., dispensing machine 102 and/or the device 104) to a location. At step 120, the request for pre-allocating a device is granted. At step 122, the second application 109 requests from the cloud application server 112 a menu badge notification upon a page refresh. At step 124, the cloud application server 112 transmits to the device 104, a list of active locations that are ready for allocation. At step 126, a location from the list is selected with the second application 109, and the selected location is transmitted to the cloud application server 112. The selected location is the location of the dispensing machine 102 that includes the optical code 108 for scanning with the device 104. At step 128, confirmation of the location selection is transmitted to the device 104 from the cloud application server 112. Confirmation of an internal structure (e.g., shelf layout, dispensing system, dispensing machine specification, planogram, product layout) of the dispensing machine 102 and location requirement for the internal structure may occur (e.g., system requirements, pre-allocation requirements). At step 130, the device 104 is synchronized with cloud application server 112.

With additional reference to FIG. 1B, at step 132, confirmation of successful synchronization is transmitted to the device 104. At step 134, successful sync triggers transmission of a request for an API (application programming interfaces) call using a push device token from the cloud application server 112 to the cloud messaging server 110, with an update type for allocating the location of the dispensing machine 102 and the same is updated. At step 136, the completions of step 134 triggers the cloud messaging server 110 to transmit to the first application 106, a push notification message for performing an update action. At step 138, the cloud application server 112 receives from the cloud messaging server 110, a response to store message identification (ID), notification type, dispensing machine ID, and a success and/or failure (state/status) of operations in a notification table. At step 140, a request for updating a read status against a message ID mapped with a dispensing machine ID, notification ID, and notification type in the notification table. At step 142, the first application 106 receives a success response on confirming the read status, from the cloud application server 112. At step 144, the first application 106 transmits a request for changing the visual representation on a screen/display layout upon allocation, updating advertisement, access data and location configurations, to the cloud application server 112. At step 146, the first application 106 fetches updates for changing the visual representation on screen/display layout upon allocation, advertisement, access data, and location configurations. At step 147, the allocation of the dispensing machine 102 is successful.

Figure 2:
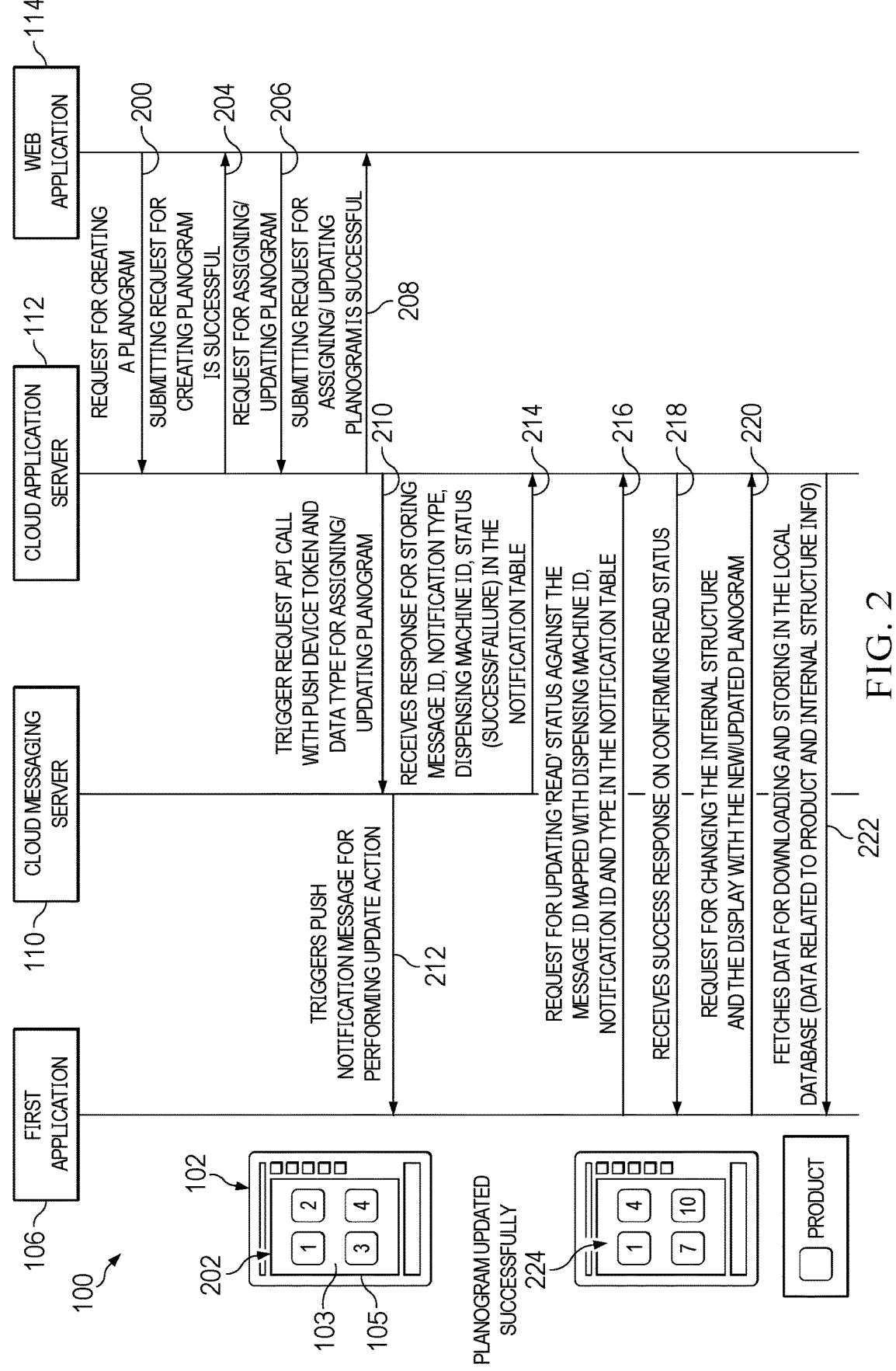
FIG. 2 illustrates a method for updating a planogram for the dispensing machine via the network server, in accordance with examples of the present disclosure.

FIG. 2 illustrates a method for updating a planogram 202 for the dispensing machine 102 via the network server 100, in accordance with examples of the present disclosure. Updating of the planogram includes updating internal arrangement of products within the dispensing machine 102 and updating of products on the display 103 of the dispensing machine 102. The network 100 also includes a first application 106, a cloud messaging server 110, a cloud application server 112, a web application 114 and a second application 109. The dispensing machine 102 includes (or is associated with) a first application 106 for operating the dispensing machine 102 within the network 100. The dispensing machine 102 may also include internal compartment/product layout structure 105, input device(s) (e.g., sensor(s), keyboard, mouse, touchpad, scanners, RFID readers, card readers, NFC readers, data reader devices, touch screen, buttons, switches) and output device(s) (e.g., display, monitor, printer, secondary display unit). The display 103 is also an example of an output device. At step 200, the web application 114 transmits to the cloud application server 112, a request for creating a planogram 202. At step 204, submitting request for creating a planogram is successful, and confirmation is transmitted from the cloud application server 112 to the web application 114. At step 206, the web application 114 transmits to the cloud application server 112, a request for assigning/updating the planogram 202. At step 208, submitting request for assigning/updating a planogram is successful, and confirmation is transmitted from the cloud application server 112 to the web application 114. At step 210, the completion of the step 208 triggers transmission of a request for an API call using a push device token and data type for assigning/updating the planogram 202. The request is transmitted from the cloud application server 112 to the cloud messaging server 110. At step 212, completion of step 210 triggers the cloud messaging server 110 to transmit to the first application 106, a push notification message. The push notification message may include an update action. At step 214, the cloud application server 112 receives from the cloud messaging server 110, a response for storing a message ID, notification type, vending/dispensing machine ID, status of operation (success and/or failure) in notification table. At step 216, a request is transmitted from the first application 106 to the cloud application server 112. The request is for updating a read status against the message ID mapped with the dispensing machine ID, notification ID and type in the notification table. At step 218, the first application 106 receives from the cloud application server 112, a success response on updating read status. At step 220, the first application 106 transmits to the cloud application server 112, a request for assigning/updating the new/existing planogram 202 with product details (e.g., data, items for sale in dispensing machine) of the dispensing machine 102. At step 222, the first application 106 receives/fetches from the cloud application server 112, data for downloading and storing in the local database of the dispensing machine. The data may also include product information including manufacturing date, packaging ID, batch numbers, brand name, product name, product description details, product ID, product type, product image ID, product images, product dimensions, product weight, product shape, product expiry date, product contents, product ingredients, nutritional facts, allergen details, product quantity, arrangements of products info on display 103, price update and internal structure info including internal structure ID, name and image, product structure allocation ID, dimensions and product coordinates ID with position values. At step 224, the planogram 202 is updated.

Figure 3:
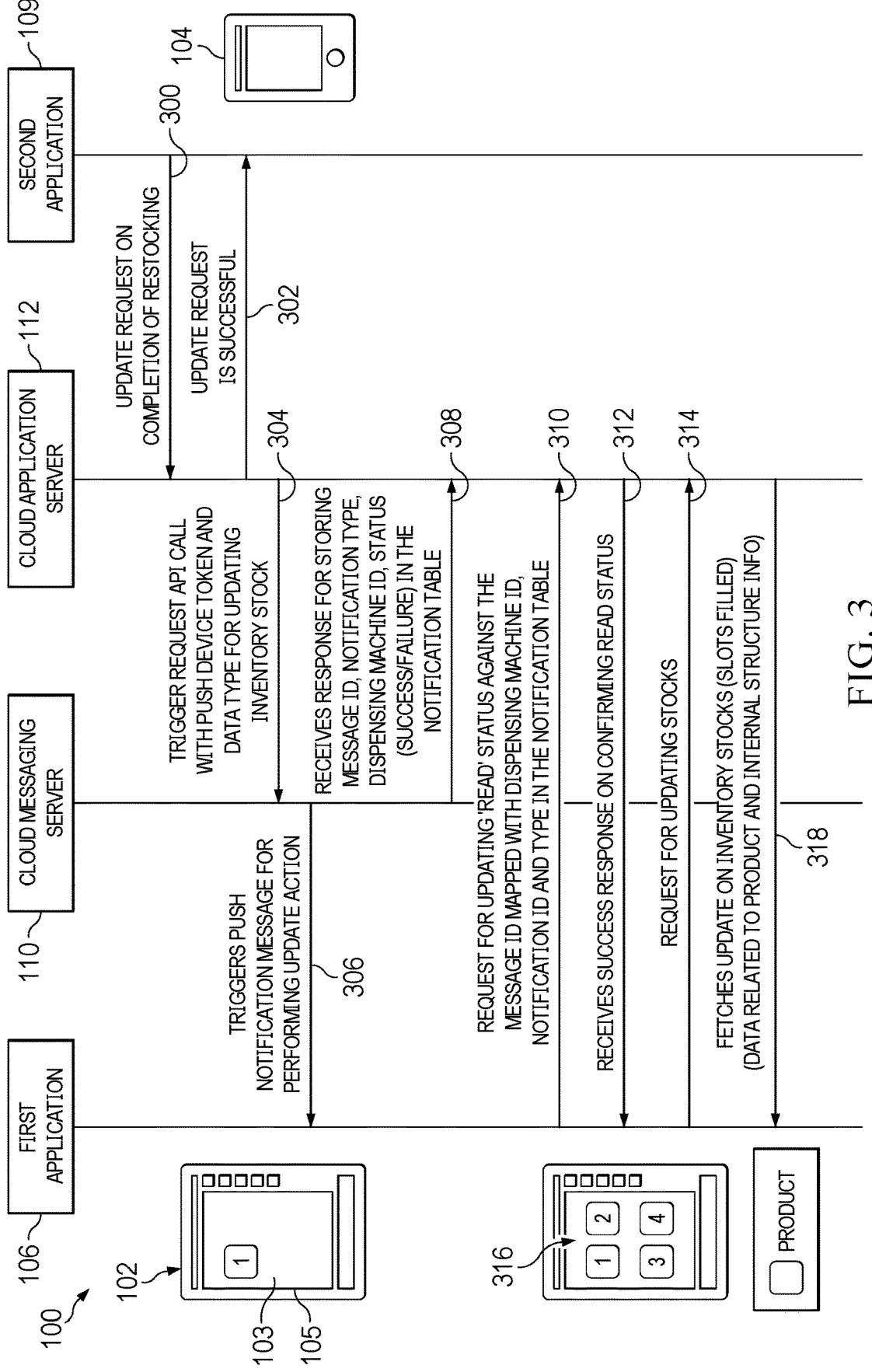
FIG. 3 illustrates a method for updating inventory for a dispensing machine via a server using a second application, in accordance with examples of the present disclosure.

FIG. 3 illustrates a method for updating inventory for a dispensing machine via a server using a second application, in accordance with examples of the present disclosure. A network 100 includes a dispensing machine 102 (e.g., a vending machine) and a device 104 (e.g., an electronic user device such as a smartphone, tablet, laptop). The dispensing machine 102 includes (or is associated with) a first application 106 for operating the dispensing machine 102 within the network 100. The device 104 includes a second application 109 (software) for operating the device 104 within the network 100. The network 100 also includes a first application 106, a cloud messaging server 110, a cloud application server 112, a web application 114 and a second application 109. The dispensing machine 102 may also include internal compartment/product layout structure 105, input device(s) (e.g., sensor(s), keyboard, mouse, touchpad, scanners, RFID readers, card readers, NFC readers, data reader devices, touch screen, buttons, switches) and output device(s) (e.g., display, monitor, printer, secondary display unit). The display 103 is also an example of an output device. At step 300, upon restocking by a vendor, the second application 109 sends to the cloud application server 112, an update request on completion of restocking in the dispensing machine 102. At step 302, the cloud application server 112 sends a message to the second application 109 indicating successful restocking update request of the dispensing machine 102. At step 304, the completion of the step 302 triggers the cloud application server 112 to send a request API call (with a push device token and data type for updating inventory/stock), to the cloud messaging server 110. At step 306, completion of the step 304 triggers the cloud messaging server 110 to send a push notification message for performing an update action, to the first application 106. At step 308, the cloud application server 112 receives a response from the cloud messaging server 110, for storing message ID, notification type, dispensing machine ID, status of operation (success and/or failure) in the notification table. At step 310, the first application 106 sends a request for updating read status against the message ID mapped with the dispensing machine ID, notification ID and type in the notification table, to the cloud application server 112. At step 312, the first application 106 receives a success response on confirming the read status, from the cloud application server 112. At step 314, the first application 106 sends a request for updating inventory and data, to the cloud application server 112. At step 318, the first application 106 fetches from the cloud application server 112, an update on inventory (slots filled), data related to product information including manufacturing date, packaging ID, batch numbers, brand name, product name, product description details, product ID, product type, product image ID, product images, product dimensions, product weight, product shape, product expiry date, product contents, product ingredients, nutritional facts, allergen details, product quantity, arrangements of products info on display 103, price update and internal structure info including internal structure ID, name and image, product structure allocation ID, dimensions and product coordinates ID with position values. At step 316, the inventory is updated on the display 103 of the dispensing machine 102

Figure 4:
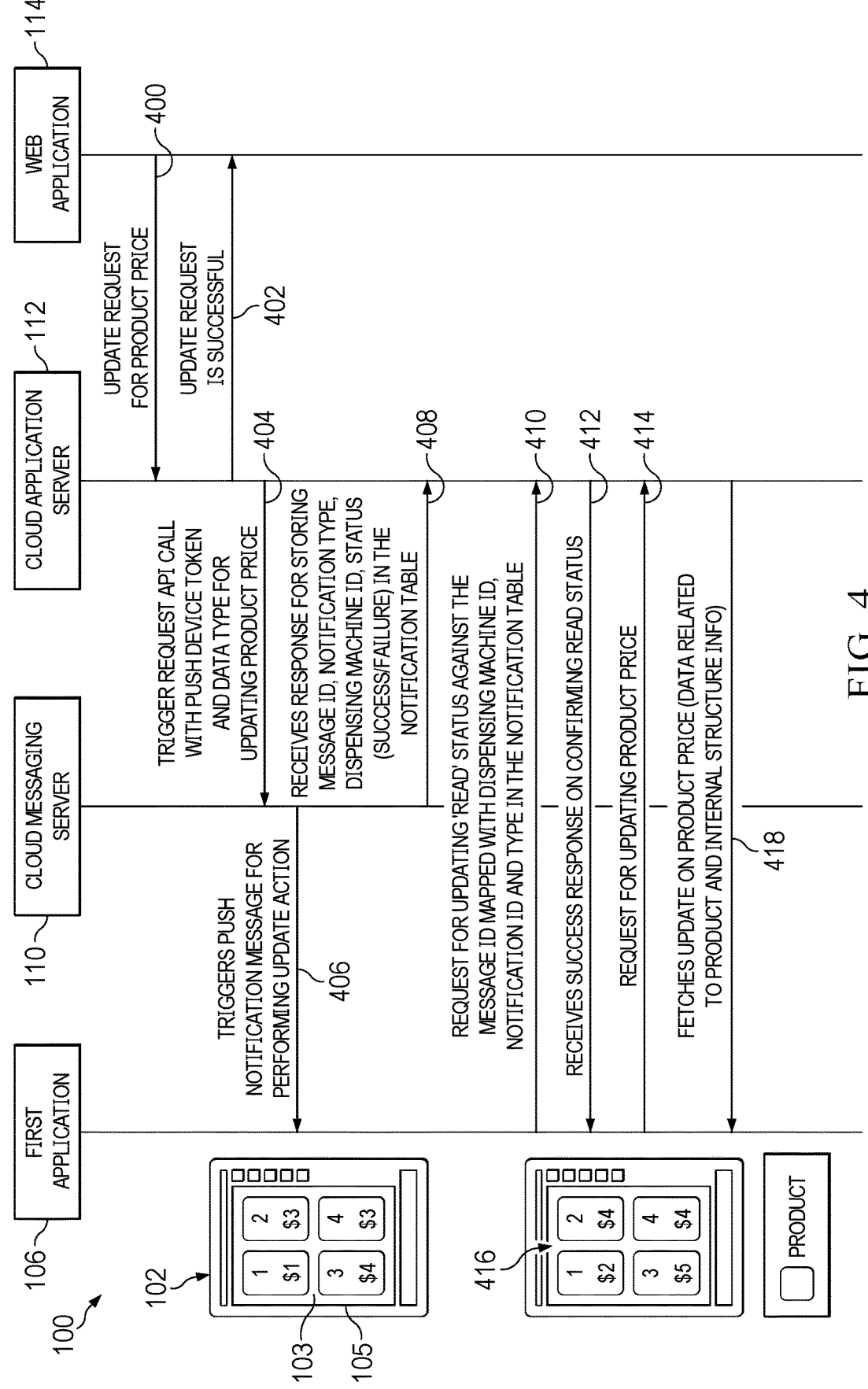
FIG. 4 illustrates a method for updating a product price via a server, in accordance with examples of the present disclosure.

FIG. 4 illustrates a method for updating a product price via a server, in accordance with examples of the present disclosure. The method for updating the product price will be the same for one or many products. The network 100 also includes a first application 106, a cloud messaging server 110, a cloud application server 112, a web application 114 and a second application 109. The dispensing machine 102 includes (or is associated with) a first application 106 for operating the dispensing machine 102 within the network 100. The dispensing machine 102 may also include internal compartment/product layout structure 105, input device(s) (e.g., sensor(s), keyboard, mouse, touchpad, scanners, RFID readers, card readers, NFC readers, data reader devices, touch screen, buttons, switches) and output device(s) (e.g., display, monitor, printer, secondary display unit). The display 103 is also an example of an output device. At step 400, the web application 114 sends an update request to the cloud application server 112, for updating product price. At step 402, the product price update request is successful, and the cloud application server 112 sends a message to the web application 114 indicating successful update request of product price. At step 404, the completion of the step 402 triggers the cloud application server 112 to send a request API call with a push device token and data type (for updating product price), to the cloud messaging server 110. At step 406, the completion of the step 404 triggers the cloud messaging server 110 to send a push notification message for performing an update action, to the first application 106. At step 408, the cloud application server 112 receives a response from the cloud messaging server 110, for storing message ID, notification type, dispensing machine ID, status of operation (success and/or failure) in the notification table. At step 410, the first application 106 sends a request for updating read status against the message ID mapped with the dispensing machine ID, notification ID and type in the notification table, to the cloud application server 112. At step 412, the first application 106 receives a success response on confirming a read status, from the cloud application server 112. At step 414, the first application 106 sends a request for updating a product price and data, to the cloud application server 112. At step 418, the first application 106 fetches from the cloud application server 112, update on product price, data related to product information including manufacturing date, packaging ID, batch numbers, brand name, product name, product description details, product ID, product type, product image ID, product images, product dimensions, product weight, product shape, product expiry date, product contents, product ingredients, nutritional facts, allergen details, product quantity, arrangements of products info on display 103, stock update and internal structure info including internal structure ID, name and image, product structure allocation ID, dimensions and product coordinates ID with position values. At step 416, the updates are made on display 103 of dispensing machine 102.

Figure 5:
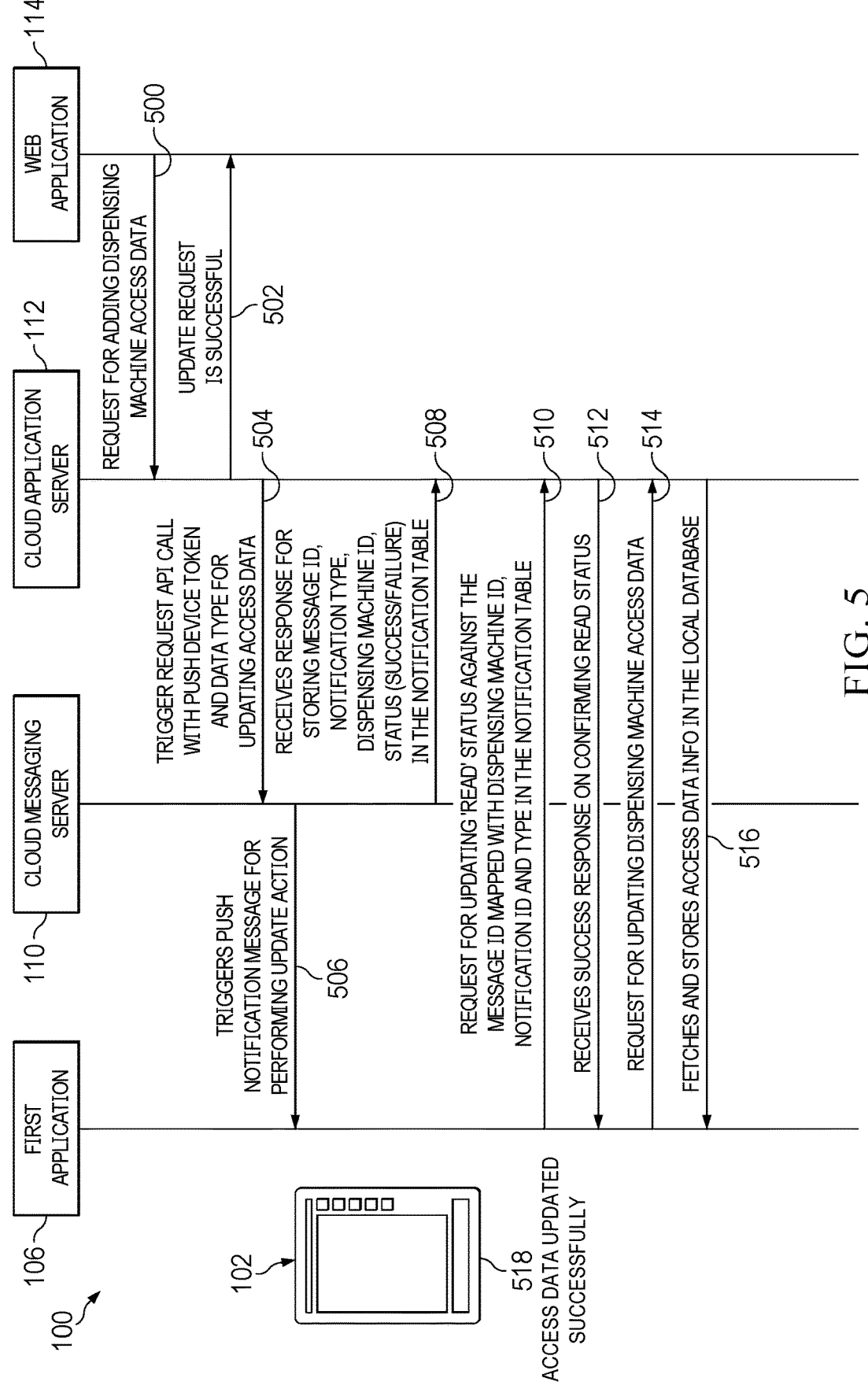
FIG. 5 illustrates a method for updating access data of authorized personnel for a dispensing machine via a server, in accordance with examples of the present disclosure.

FIG. 5 illustrates updating access data of authorized personnel for a dispensing machine via a server, in accordance with examples of the present disclosure. The access data may be in communication with other components of dispensing machine to enable access of authorized personnel; the access may include unlocking of door, access to one or more product, energizing/de-energizing internal component of dispensing machine. The network 100 also includes a first application 106, a cloud messaging server 110, a cloud application server 112, a web application 114 and a second application 109. The dispensing machine 102 includes (or is associated with) a first application 106 for operating the dispensing machine 102 within the network 100. The dispensing machine 102 may also include input device(s) (e.g., sensor(s), keyboard, mouse, touchpad, scanners, RFID readers, card readers, NFC readers, data reader devices, touch screen, buttons, switches) and output device(s) (e.g., display, monitor, printer, secondary display unit). At step 500, the web application 114 transmits to the cloud application server 112, an update request for adding dispensing machine access data. At step 502, the cloud application server sends a message to the web application 114 that the access data update request is successful. At step 504, the completion of the step 502 triggers the cloud application server 112 to send a request API call with a push device token and data type for updating access data, to the cloud messaging server 110. At step 506, the completion of the step 504 triggers the cloud messaging server 110 to send a push notification message for performing an update action, to the first application 106. At step 508, the cloud application server 112 receives a response from the cloud messaging server 110, for storing message ID, notification type, dispensing machine ID, status of operation (success and/or failure) in the notification table. At step 510, the first application 106 sends a request for updating read status against the message ID mapped with the dispensing machine ID, notification ID and type in the notification table, to the cloud application server 112. At step 512, the first application 106 receives a success response on confirming the read status, from the cloud application server 112. At step 514, the first application 106 sends a request for updating access data, to the cloud application server 112. At step 516, the first application 106 fetches from the cloud application server 112, access data (access type, access card holder name, card number, key ID) and stores the access data in the local database of the dispensing machine 102. At step 518, access data is updated on the dispensing machine 102 successfully.

Figure 6:
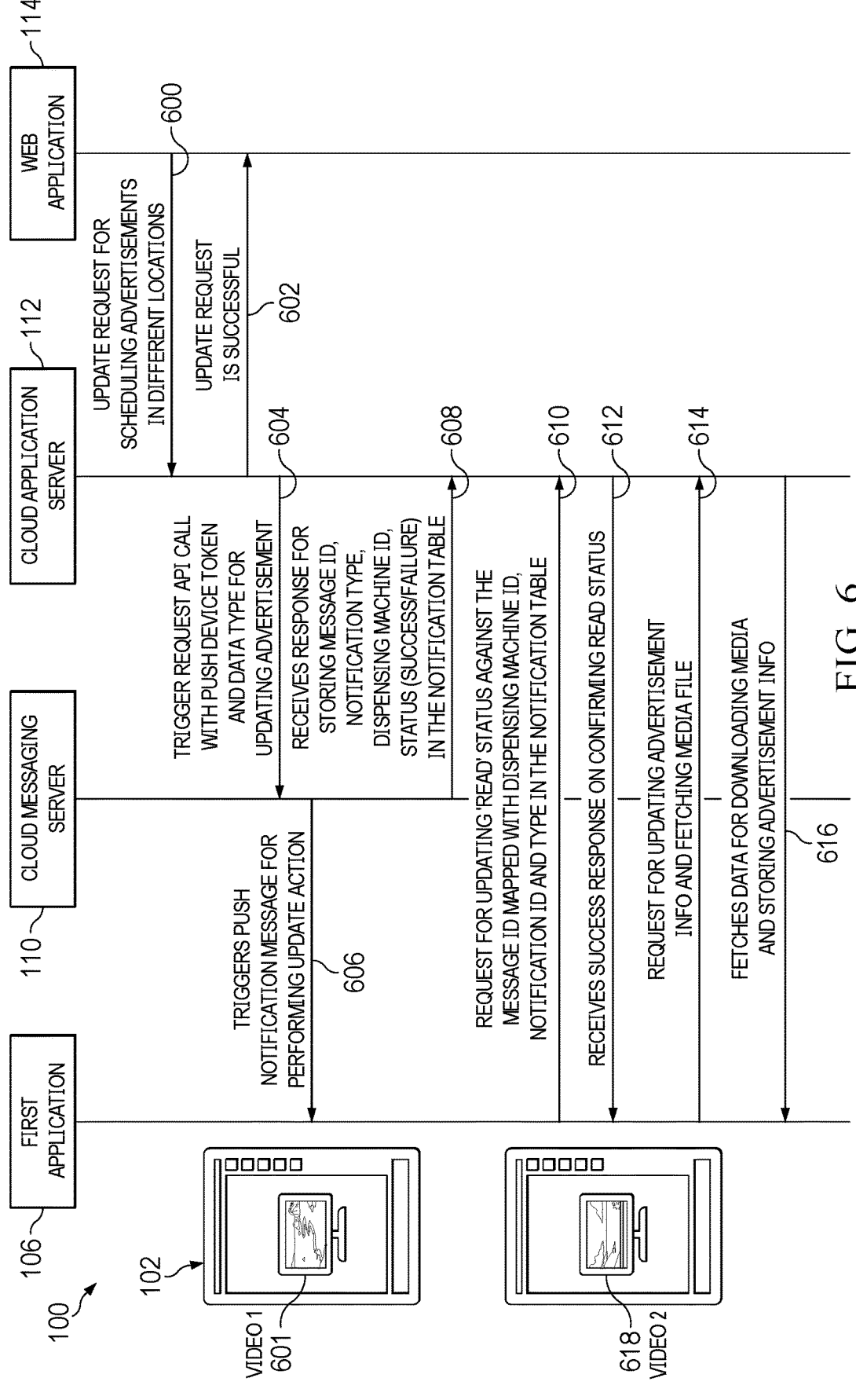
FIG. 6 illustrates a method for managing advertisements/campaigns in a vending/dispensing network system, in accordance with examples of the present disclosure.

FIG. 6 illustrates a method for managing advertisements/campaigns in a vending/dispensing network system, in accordance with examples of the present disclosure. The network 100 also includes a first application 106, a cloud messaging server 110, a cloud application server 112, a web application 114 and a second application 109. The dispensing machine 102 includes (or is associated with) a first application 106 for operating the dispensing machine 102 within the network 100. The dispensing machine 102 may also include input device(s) (e.g., sensor(s), keyboard, mouse, touchpad, scanners, RFID readers, card readers, NFC readers, data reader devices, touch screen, buttons, switches) and output device(s) (e.g., display, monitor, printer, secondary display unit). At step 600, the web application 114 transmits to the cloud application server 112, an update request for scheduling advertisement(s) 601 (or campaigns) in different locations. At step 602, indicates that the update request for scheduling advertisements 601 at the web application 114 is successful. At step 604, the completion of the step 602 triggers the cloud application server 112 to send a request API call with a push device token and data type for updating advertisement, to the cloud messaging server 110. At step 606, the completion of the step 604 triggers the cloud messaging server 110 to send a push notification message for performing an update action, to the first application 106. At step 608, the cloud application server 112 receives a response from the cloud messaging server 110, for storing message ID, notification type, dispensing machine ID, status of operation (success and/or failure) in the notification table. At step 610, the first application 106 sends a request for updating read status against the message ID mapped with the dispensing machine ID, notification ID and type in the notification table, to the cloud application server 112. At step 612, the first application 106 receives a success response on confirming the read status, from the cloud application server 112. At step 614, the first application 106 sends a request for updating advertisement info for a location and fetching a media file, to the cloud application server 112. At step 616, the first application 106 fetches from the cloud application server 112, data for downloading media and storing advertisement information including advertisement ID, start date and time of advertisement, end date and time of advertisement, no of looping, advertisement timeline ID with media details including media ID, media type, images, videos, optical code with downloadable features, optical code with URL links, optical code with coupons, optical code with promotion codes and media URLs in the local database of the dispensing machine 102. At step 618, the advertisement(s) 601 are updated on the dispensing machine 102 successfully.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method comprising:

generating an optical code on a web application;

displaying an optical code on a first application associated with a dispensing machine;

pre-allocating the dispensing machine to a location via a web application;

receiving on the cloud application server, a request for a menu badge notification, wherein the request is sent from a second application;

transmitting from the cloud application server, a list of active locations that are ready for allocation;

receiving on the cloud application server, a selection for the location from the list of active locations that includes the optical code for scanning with a second application;

transmitting from the cloud application server, a confirmation of an internal structure of dispensing machine, location requirement for the said internal structure; and synchronization of dispensing machine;

requesting an API call with push device token and update type for allocating the location;

transmitting at least one push notification message to the first application for performing an update action, via a messaging server;

receiving on the cloud application server, a response for storing a message ID, a notification type, a dispensing machine ID, success and/or failure state in a notification table, wherein the response is transmitted from a cloud messaging server;

transmitting a request for updating a read status for the message ID that is mapped with the dispensing machine ID, the notification ID and type in the notification table, to the cloud application server;

sending a request for changing the visual representation upon allocation of the dispensing machine, and a request for updating an advertisement, dispensing machine access data, and the location configurations, wherein the request is sent from the first application to the cloud application server;

receiving on the first application, updates for changing the visual representation upon allocation, the advertisement, the dispensing machine access data, and the location related configurations; and allocating the dispensing machine to the location.

2. The method of claim 1, further comprising receiving with the cloud application server, a request to pre-allocate the dispensing machine to the location.

3. The method of claim 2, wherein the request is received from a web application before the pre-allocating.

4. The method of claim 3, further comprising confirming system requirements for allocating a dispensing machine by communicating with the cloud application server before the synchronizing.

5. The method of claim 4, further comprising synchronizing the dispensing machine via a cloud application server.

6. The method of claim 1, wherein the optical code is displayed on the dispensing machine.

7. The method of claim 1, wherein the dispensing machine includes a vending machine.

* * * * *